United States Patent
Quirt et al.

(10) Patent No.: US 6,701,382 B1
(45) Date of Patent: Mar. 2, 2004

(54) NAME SERVICE FOR TRANSPARENT CONTAINER OBJECTS

(75) Inventors: Alan Richard Quirt, Kanata (CA); Roderick B. Story, Ottawa (CA); William Anthony Gage, Stittsville (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/219,316

(22) Filed: Dec. 23, 1998

(51) Int. Cl.[7] .............................................. G06F 9/00
(52) U.S. Cl. ...................................... 709/316; 709/315
(58) Field of Search ................................ 707/100, 101, 707/102, 103; 709/316, 315, 313, 314, 310

(56) References Cited

U.S. PATENT DOCUMENTS 5,809,507 A * 9/1998 Cavanaugh, III ........... 707/103
6,076,090 A * 6/2000 Burroughs et al. ......... 707/102

OTHER PUBLICATIONS

Stallings, William, *Operating Systems*, Chapters 12 and 13, Prentice Hall 2nd edition (1995), pp. 487–571.

* cited by examiner

*Primary Examiner*—John Follansbee
*Assistant Examiner*—The Thanh Ho

(57) ABSTRACT

The invention relates to a software object, more particularly a software Name Service object providing facilities for supporting transparent container objects. The software container objects contain a group of software objects herein referred to as fine grain objects, the fine grain objects communicating with external objects through the container's interface. This invention permits objects in the distributed system to communicate with specific ones of the fine grain objects within containers without requiring the Name Service to store an entry for each fine grain object. This allows a reduction in the size of the data structures within the Name Service and an improved usage of system resources. The Name Service stores an entry for a given container object including a range of fine grain objects implemented within the given container. The Name Service also provides a module for addressing a fine grain object within a container through the use of a computed index that is transparent to the objects in the system. This invention further provides a method for reducing the number of entries in a Name Service object as well as a computer readable medium containing a Name Service object program. This invention is particularly useful in the context of the Common Object Request Broker Architecture (CORBA).

15 Claims, 12 Drawing Sheets

NAME SERVICE FOR TRANSPARENT CONTAINER OBJECTS

FIELD OF THE INVENTION

This invention relates to a method and software object for grouping a set of software items under a common interface. It is particularly applicable to object-oriented software applications and may be used to reduce the number of entries in a name lookup service and improve the speed of requests in a system.

BACKGROUND

From the standard microwave oven to the sophisticated database retrieval system, software is being developed at an increasingly rapid rate and the revenues generated from it are exponentially increasing. At the same time the size of software systems and applications is also increasing. Commonly a same system is run on several machines, herein referred to as nodes, each node running a portion of the applications. The nodes communicate with one another through a communication link using ATM or any other suitable communication protocol. The set of nodes interconnected by a communication device constitutes a distributed network system. Distributed processing is a powerful way to make software scaleable and to allow a single system to have components in multiple locations. Many standards for distributed processing exist and are commonly used. As a specific example, the Common Object Request Broker Architecture (CORBA) provides a basic mechanism for transparently distributing software objects across multiple processors connected to a network. Communicating CORBA objects may be written in a variety of programming languages, and may run on a variety of computer processor types. The communication, and any needed translation between the different data formats of varying processor types and programming languages, is handled automatically by CORBA. CORBA is a standard defined by the Object Management Group (OMG). For more information on the COREA standard the reader is invited to consult "The Essential CORBA: Systems Integration Using Distributed Objects", by Thomas J. Mowbray and Ron Zahavi, Object Management Group Inc, 1998, whose content is hereby incorporated by reference.

Telecommunication software is an example of a distributed network system. Of particular interest here is object-oriented telecommunication software. Object-oriented software for telecommunication (voice or data) typically uses many small software objects that represent people, equipment such as telephones and computers and even individual telephone calls. Such small objects are commonly called fine grain objects.

A simple approach to making any kind of object-oriented application distributable is to treat each fine grain object as a separate entity. For this method, each object needs a separate object reference, entries in data tables and process/thread resources. Unfortunately this does not scale well for systems containing a large number of fine grain objects even though the code that handles message dispatching to the objects may be shared in a good implementation. The result, as the number of fine grain objects grows large, is system performance degradation. The practical limit in typical systems is on the order of hundreds of objects per processor. The large numbers of objects commonly found in telecommunication systems, sometimes millions in a large system, makes the use of this approach impractical.

Another approach is to explicitly group objects, making an object-group structure, each fine grain object being visible in the interface of the object-group structure. This has the advantage of reducing the number of objects in the tables but makes object-group boundaries visible in application code. These visible boundaries make it difficult to split or combine object-groups if the size of a system changes since the interface must be changed. This results in additional costs as well as possible errors. Also it is generally not possible to change the implementation of a class of objects to use (or stop using) object-groups, without rewriting both server and client code.

Thus, there exists a need in the industry to provide a method and apparatus for reducing the number of object references in a system such as to improve the use of resources in a software system.

SUMMARY OF THE INVENTION

For the purpose of this specification, the word "system" is used to designate the entity managing the messages in the distributed network. In a specific example, the system refers to the operating system. In another specific example, system is the CORBA message system.

For the purpose of this specification, the word "object" is used to designate a collection of related data with an interface that defines the operations available on that data. The software code for the object is generally written in a programming language appropriate to its functions, such as Smalltalk, C++, Pascal, Java, or Assembler.

For the purpose of this specification, the word "container" is used to designate a software entity that holds a collection of objects. The objects in the container are herein referred to as "fine grain objects".

For the purpose of this specification, the expression "independent object" is used to designate an object not grouped with other objects in a container.

For the purpose of this specification, the expression "external object" is used to designate an object that is external to a specific container. For example, if objects A B and C are in the same container and object D is not a member of the container, we say that object D is an external object to A B and C.

For the purpose of this specification, the expression "same Kind" is used to designate object classes with the same interface irrespective of the underlying implementation of the class. For example, a Kind "PRINTER" may include different classes of the type "LAZER 4000", "INK JET 200" and "LAZER 3000" provided the interface of these classes is the same irrespective of their individual implementation.

For the purpose of this specification, the expression "persistent name" is used to designate the static name of a software entity that external software objects use to communicate with it. The persistent name is typically independent of the location of the software entity in the system. In a specific example, the persistent name of an object is in the form of a character string.

For the purpose of this specification, the expression "software object reference" is used to designate the software location of an instance of an software object in a system. This expression should be given a broad interpretation to include a pointer to actual object references, pointers to memory locations containing software references and other equivalents. Typically, within the object reference is a hardware node address that specifies the network location of the software object. In the preferred embodiment, a Name Service translates the persistent name of a software object into its software object reference. A particular object with a certain persistent name maintains its persistent name irrespective of the instantiation of that object. On the other hand, each instantiation of a certain object is typically given a different object reference that is valid only for that particular instantiation. For example, if a subsystem of a distributed software system is taken out of service then is subsequently restarted on the same node or on some other node, each object in the restarted subsystem keeps the same persistent name that it had formerly, but is given a new object reference.

In summary, the present invention provides a computer readable storage medium containing a program element for implementing on a computer a Name Service object that maps persistent names to object references.

The Name Service includes a data structure with a plurality of entries, each entry including a range of persistent names mapped to an object reference. When the Name Service receives a look-up request message from an external software object, it searches the data structure containing the entry with the persistent name range containing the persistent name submitted in the look-up request message. Next, the Name Service computes an index that is appended to the object reference associated with the range of persistent names. The combination object reference/index allows uniquely distinguishing the software object that corresponds to the persistent name submitted in the look-up request message. This feature allows reducing the number of entries in the data structure since it is no longer required to provide a separate entry for each software object.

The invention also extends to a computer system implementing the above described software Name Service object, and to a method for implementing a Name Service object.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

In this specification, the nomenclature used in object oriented programming has been employed. Expression such as "message passing", "class", "object", "inheritance", "encapsulation", "object" are well-known in the art of object oriented software design (OOD). For the reader who wishes to consult a reference on the topic of object oriented design, "The Object Concept, an introduction to computer programming using C++" by Rick Decker & Stuart Hirsfield PWS publishing Company, Toronto 1995, presents the basics of OOD. The content of the above document is hereby incorporated by reference.

Figure 1:
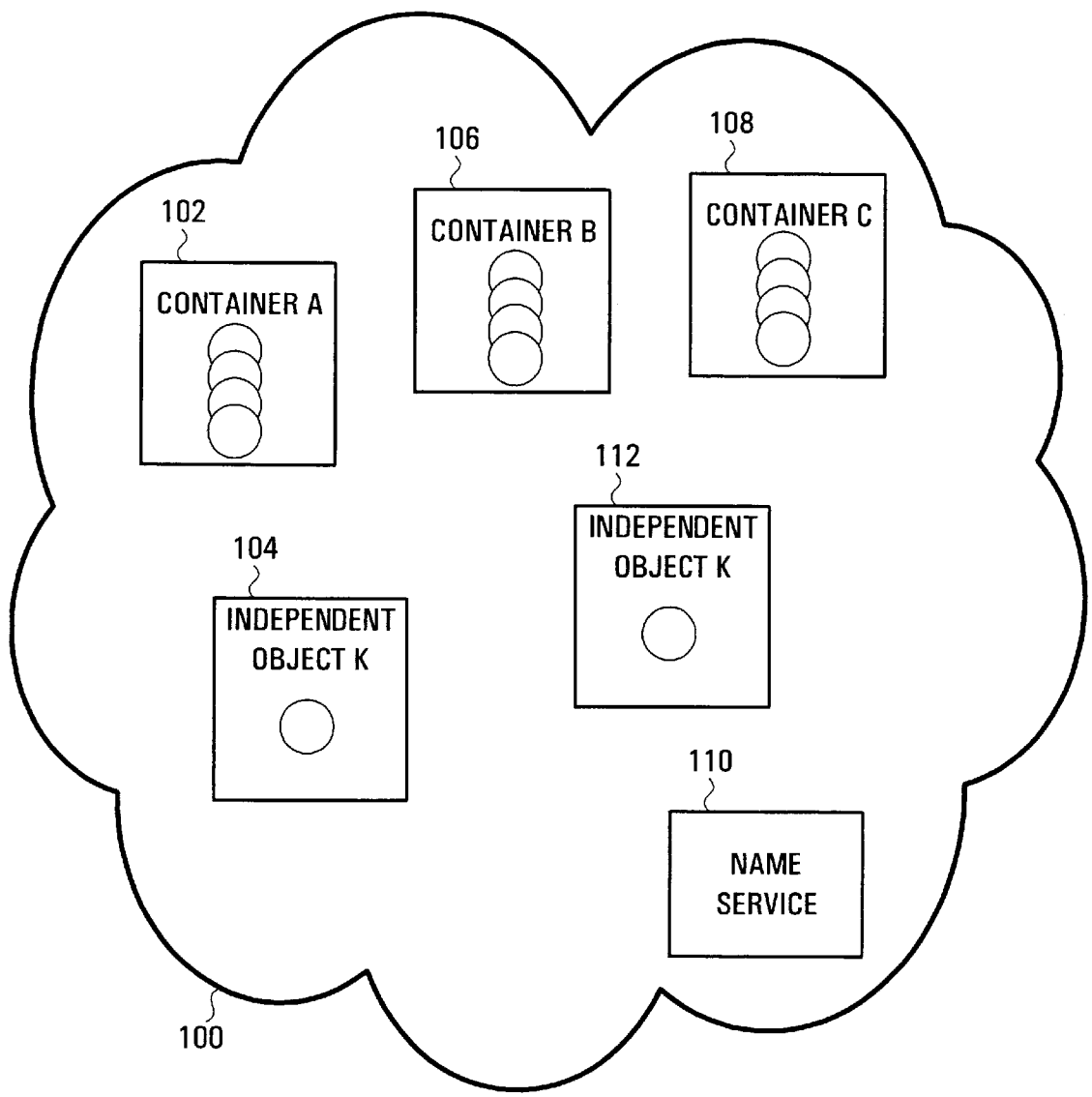
FIG. 1 shows a block diagram of a software system containing embodiments of the container objects.

In the preferred embodiment of this invention, the Name Service is integrated in an object oriented software system 100, as shown in FIG. 1, comprising a set of Independent objects 104 and 112, a set of container objects 102 106, 108 and a Name Service 110. The objects 102, 104, 106, 108 and 112 in the system perform tasks within the system and may communicate with one another through messages. All the objects need not reside in the same physical location. The Name Service 110 allows a given object to locate another object in the system through the use of a persistent name.

Though there may be very large numbers of objects in a software system, there are usually fewer kinds of objects. Many objects have the same public interface allowing other objects to communicate with them using a common set of messages. These objects with the same interface often provide similar services and are said to belong to the same "Kind". For example, a telecommunications application may have several software objects of the Kind "User Object" each software object representing an actual physical user.

In order to refer to individual objects in a software system, a persistent name is given to each object. In a preferred embodiment, the persistent name of an individual object comprises two parts, a Kind and an Identifier. All objects with a particular Kind value have the same interface. In a specific embodiment, the first part of an object name is the Kind, which indicates what interface the object presents and the second part is the Identifier. For example, User objects and Terminal objects have different Kind values. The Identifier portion of the persistent name identifies each particular object instance of a given Kind. For example in a telecommunication application, the Kind could indicate a User Object, and the Identifier could be the telephone number of the user. The format of the Identifier depends on the particular Kind of the object. This basic definition of a persistent name as a two-part name including a Kind and Identifier is taken from the standard CORBA naming model. Other suitable naming conventions may be used here without detracting from the spirit of the invention.

The persistent name of an object generally exists within a naming context. The naming context itself has a name and can be nested within another naming context. This naming convention can easily represent typical hierarchical computer file system names, or the names used by the Internet Domain Name Service. In the standard CORBA naming model, each Kind/Identifier pair is within a naming context. The preferred embodiment of this invention uses a single naming context. The use of a hierarchy of naming contexts does not detract from the spirit of the invention.

Figure 2:
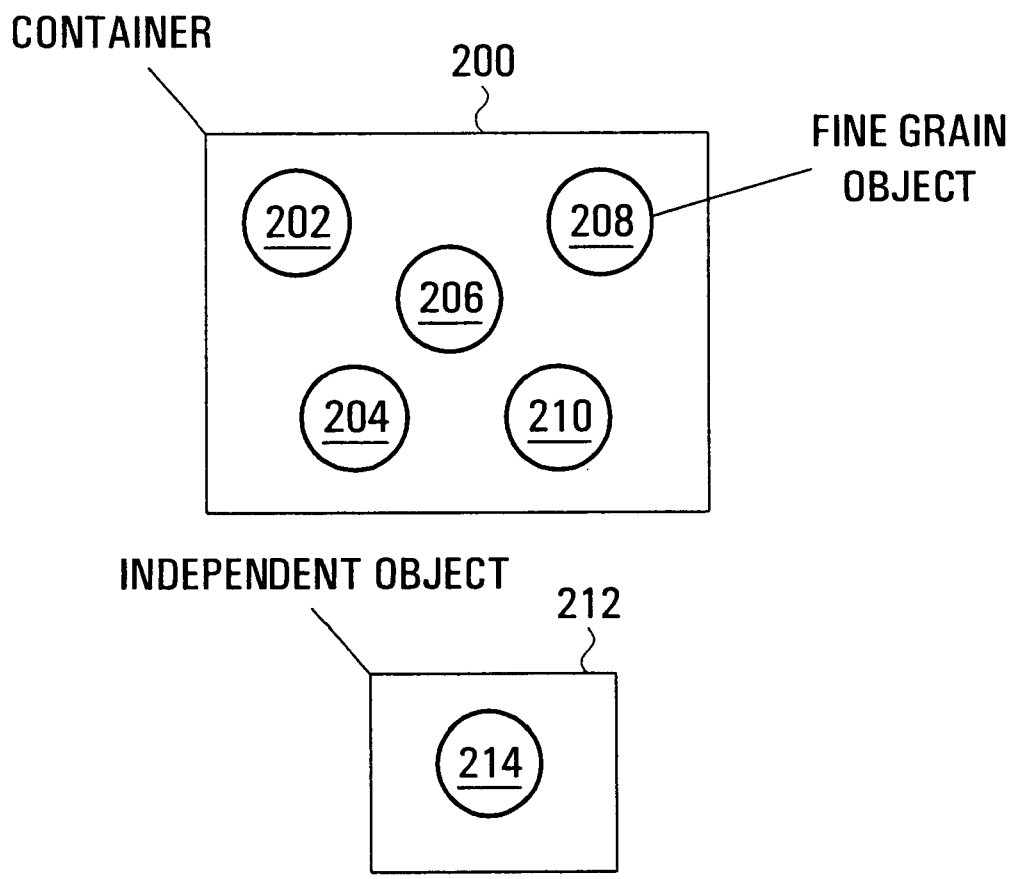
FIG. 2 shows an embodiment of a container object and an Independent Object.

The present inventors have found that by grouping objects on the basis of the same interface, the number of entries in the Name Service can be decreased and made more manageable for a system with a large number of objects thereby improving the performance of the system. In a preferred embodiment, objects belonging to the same Kind are grouped to form composite objects, herein referred to as container objects. Objects grouped in a container are herein referred to as fine grain objects. Each container may contain any number of fine grain objects without detracting from the spirit of the invention. Conceptually, container objects can be represented as shown in FIG. 2 item 200. As shown in FIG. 2, the container object 200 contains a set of fine grain objects 202, 204, 206, 208 and 210. The fine grain objects 202, 204, 206, 208 and 210 are of the same Kind and share a single common interface. This common interface is that of the container. In contrast, an independent object 212 contains a single object 214 with its own interface. In addition to reducing the number of entries in the Name Service, the use of a common interface in container objects reduces the amount of memory overhead required to store the interface for each individual fine grain object.

Figure 3:
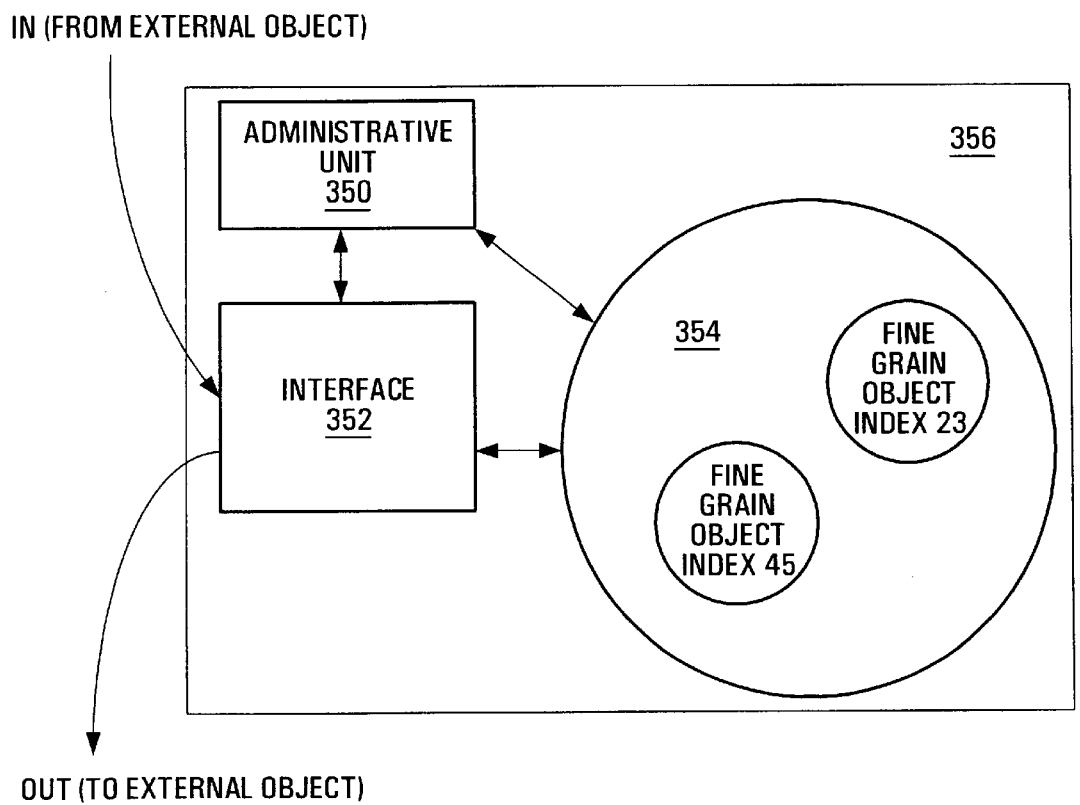
FIG. 3 shows a block diagram of a container object in accordance with an embodiment of the invention.
Figure 3A:
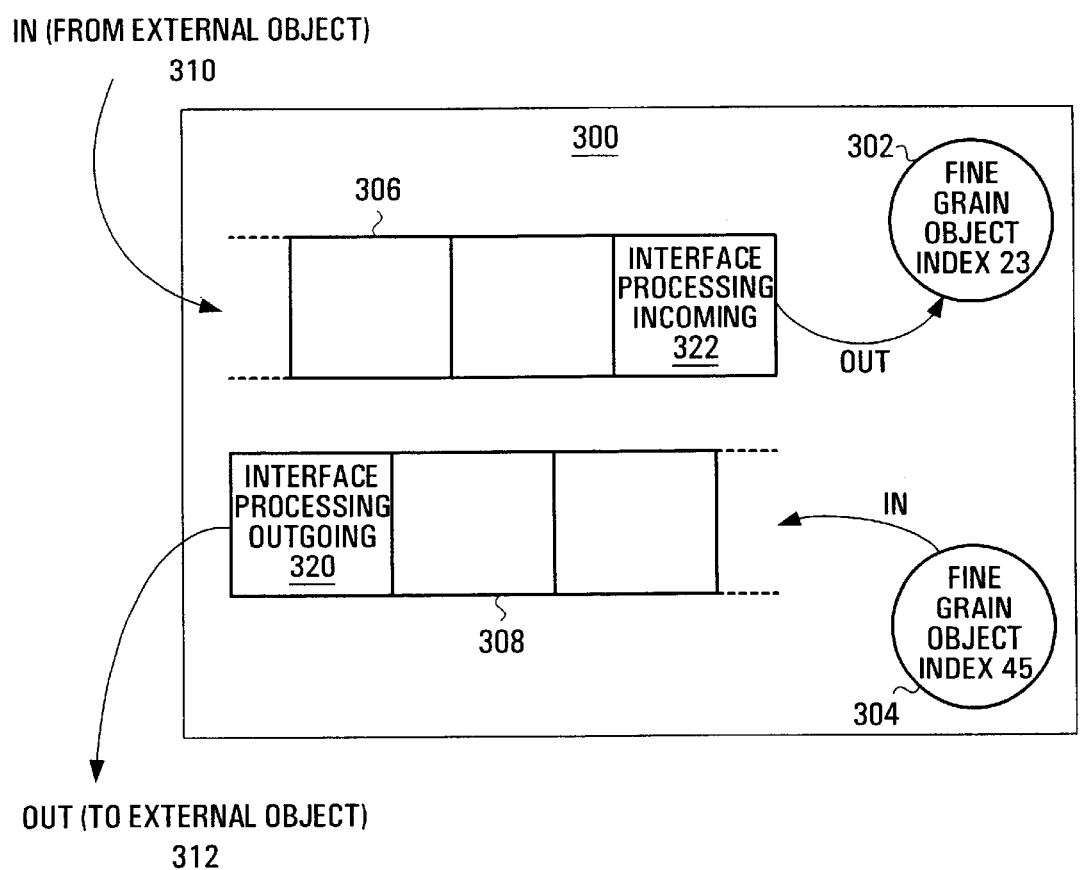
FIG. 3a shows a block diagram of the interface of a container object in accordance with an embodiment of the invention.

The structure of a container object in accordance with an embodiment of the invention is depicted in FIG. 3. The container object comprises an interface 352, a set of fine grain objects 354 and an administration unit 350. In preferred embodiment, fine grain objects within a same container use a common interface 352 to interact with external objects. As shown in FIG. 3a of the drawings, a container 300 in accordance with the spirit of the invention includes an interface comprising an input queue 306 for incoming messages 306, a output queue for outgoing messages 308, an incoming message processing unit 322 and an outgoing message processing unit 320. In a specific embodiment a single input queue and a single output queue are used for messaging purposes. These queues may be implemented as simple FIFO (first-in-first-out) queues. Alternatively, a priority queue may be used to give preference to messages of higher priority. The specific implementation of the queue may vary across implementations without detracting from the spirit of the invention. In an alternative embodiment, the output queue 308 is omitted from the container object and outgoing messages are directly processed by the outgoing message processing unit 320 and dispatched to the appropriate destination.

In a most preferred embodiment, the container object uses one operating system thread for all of its normal activities. In that situation the container handles its incoming messages one at a time. Each message is addressed to a particular fine grain object in the container that processes that message to completion before returning control to the container.

Figure 3B:
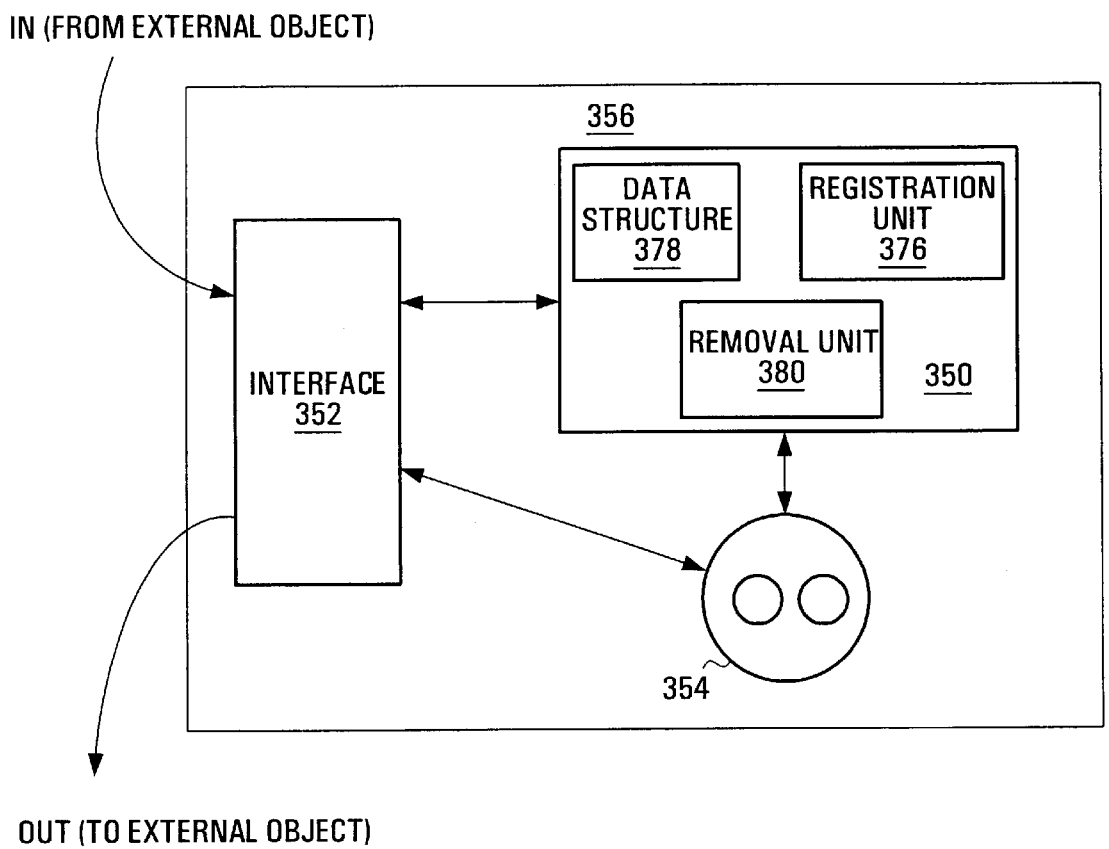
FIG. 3b shows a block diagram of the administration unit of a container object in accordance with an embodiment of the invention.

The function of the administration unit 350 is to effect the management of the fine grain objects. The structure of the administration unit 350 is depicted in FIG. 3b. The administration unit 350 includes a data structure 378 comprising entries describing the fine grain objects within the container, a registration unit 376 and optionally a removal unit 380. In a preferred embodiment, a container is assigned a pool of Identifier values for objects of a particular Kind. Any object of that Kind whose identifier falls within the pool is within that container. In a specific example, a container A of User Objects is assigned Identifiers in the range 555-1000 to 555-1999. Objects of the Kind "User Object" with Identifiers falling within this range are implemented within container A. In a specific embodiment, the persistent name of the container is of the form "KIND; lower identifier range; upper identifier range". In a specific example, the persistent name of container A may be "User; 555-1000; 555-1999".

Within each container, an index is used to differentiate the individual fine grain objects. In a specific example the data structure 378 is a table storing the mapping between the index and the identifier for each of the fine grain objects in the container. In a preferred embodiment, the index may be any suitable alphanumeric set that can be extracted from the persistent name of an object using a given algorithm. In a specific example, the fine grain objects are numbered consecutively within each container. In a specific example, there are five (5) User Objects with Identifiers in the range 555-1000 to 555-1999. The persistent name of these User Object along with an index is shown in the table below.

| Persistent Name | | |
| --- | --- | --- |
| Kind | Identifier | Index |
| User | 555–1111 | 111 |
| User | 555–1224 | 224 |
| User | 555–1345 | 345 |
| User | 555–1894 | 894 |
| User | 555–1986 | 986 |

The persistent name allows objects to communicate with other objects in the network domain irrespective of the objects location in that domain. In general, to communicate with a software object, the location of that object in the network domain must be resolved into an object reference. The object reference is the software reference of the object. Amongst other information, the object reference may include information about the node on which the object is located or other information to help locate the object in the system. A Name Service unit resolves an object's persistent name into an object reference that can be used to communicate with that object.

Figure 9:
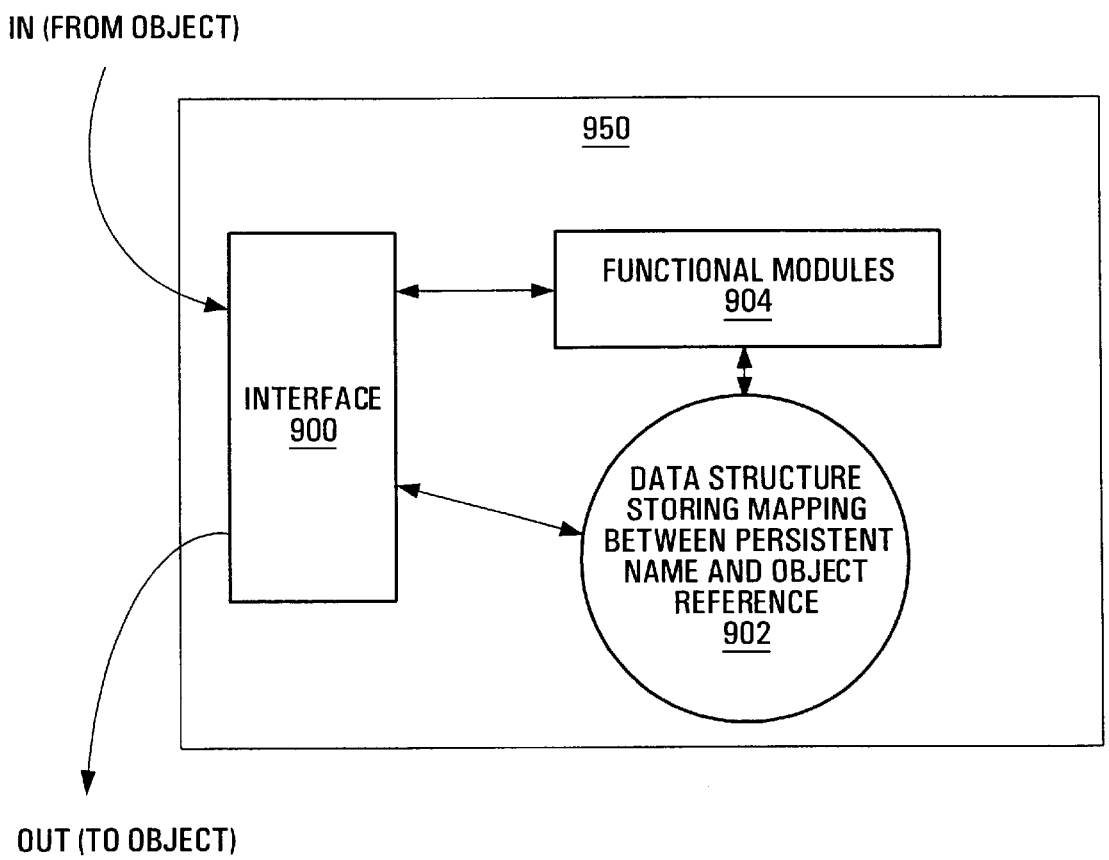
FIG. 9 shows a block diagram of the Name Service in accordance with an embodiment of the invention.

In a preferred embodiment, as shown in FIG. 9, the Name Service 950 includes an interface module 900, a data structure 902 and a set of functional modules 904. The interface 900 allows the Name Service to communicate with other objects in the system by providing input and output channels. The data structure 902 contains information relating to the mapping of persistent names with object references. The data structure permits the persistent name to be associated to a single (independent) object or to a range of objects as for designating containers. The set of functional modules 904 permits the manipulation of the data structure 902. For example, these modules allow adding a new entry in the data structure, removing an entry from the data structure, updating an object reference or other functions. In a preferred embodiment, the functional modules further provide facilities for the extraction of an index from a given persistent name.

The Name Service is an entity that is located at a well-known location in the distributed system and keeps an entry for certain objects in the system. Upon initialization, each object in the software system may register with the Name Service 950 by sending its persistent name, object reference and other relevant information to the Name Service in the form of a registration message. Preferably, when an object is deactivated, the Name Service 950 updates its data structure 902 accordingly to remove the entry relative to the deactivated object. The Name Service 950 keeps track of the mode of operation of the object (active/inactive), its location in the system and may assign a unique identifier to each object. Most preferably, the Name Service keeps a list of the objects with their location and other parameters that may be queried by external entities. The Name Service should also be able to add an entry, modify a parameter in an entry or supply information about an entry.

In a specific example, the Name Service data structure 902 can be a simple lookup table with a set of functions or methods 904 to interact with the table. When sending a message, an object may query the Name Service to obtain the object reference of the entity. In a typical interaction, an object in the system that queries the Name Service, herein referred to as a client, sends a message to the Name Service requesting the location of another object. The message contains the persistent name of the object sought. The Name Service interface 900 upon receipt of the message interacts with the functional modules 904. The functional modules 904 map the object reference to the persistent name by using the table. The Name service interface 900 then sends a reply message to the client, the message containing the object reference (or a pointer to the object reference) of the entity sought.

The Name Service provides support for Container Objects. More specifically, for each entry in the data structure 902, the Name Service stores a Kind value, an Identifier range value and an object reference. The Kind field identifies the Kind of the object corresponding to the entry. The Identifier range, specified by lower and upper limits, identifies the Identifier range within the corresponding container. For Independent objects, the lower and upper limits of the range are equal. In a preferred embodiment, the Name Service functional modules 904 provide a module implementing an algorithm to resolve a specific Identifier into an index value. In a preferred embodiment, the Name Service includes a single index resolution algorithm for all the objects in the Name Service. In a preferred embodiment, the index resolution algorithm is an arithmetic operation or a series of arithmetic operations. In a specific example, the index resolution algorithm is a subtraction operation, the lower limit of the identifier range being subtracted from the identifier portion of the persistent name of the object being looked-up.

In an alternative embodiment, the Name Service includes a set of index resolution algorithms, each algorithm of said set being associated to a respective Kind. A given algorithm may be assigned to more than one Kind without detracting from the spirit of the invention.

In another alternative embodiment, when a container object registers with the Name Service, it sends the Name Service an index resolution algorithm or an identifier data element indicating a particular index resolution algorithm. An algorithm may be sent as executable code, for example in the form of a Java program. Alternatively an algorithm identifier is used to select an algorithm from a set of algorithms already accessible by the Name Service.

In a preferred embodiment of the invention, the container object is assigned an object reference. The object reference of fine grain objects is the same as that of their container with their index value added on. In a preferred embodiment, the index used to identify an object within a container is small compared to the complete object reference. Optionally, to further reduce the overhead of storing object references, object references for each fine grain object within a particular container may be composed by storing the index value for the particular fine grain object, plus a pointer to a shared copy of the full object reference of the container. Therefore a single copy of the object reference can be stored for all the fine grain objects within a container. This single copy method is advantageous if an object reference is large compared with a pointer, as is commonly the case with CORBA object references.

Objects operating in a software system making use of this invention each register their object reference and persistent name with the Name Service. In a preferred embodiment, the container object registers with the Name Service directly. When a container registers with the Name Service, it registers its object reference and the range of names that it contains. Each container owns a name range unique within the system, and may contain thousands of objects. Preferably, no two containers of the same Kind anywhere in a system may have overlapping Identifier ranges. An independent object registers a single name, which is in effect a range whose upper and lower limits are identical. An independent object's name should not overlap any registered name range. The Table below shows an example of the entries in the Name Service table for container objects and for Independent objects.

| Entry # | Kind | Identifier Range | Object Reference (pointer) |
|---|---|---|---|
| 1 | USER | 555–0000; 555–0999 | A452C67 |
| 2 | USER | 555–1000; 555–1999 | B56345E |
| ... | ... | ... | ... |
| K | TERMINAL | V01; V49 | AFE5270 |
| K + 1 | TERMINAL | V50; V99 | BF35516 |
| K + 2 | PRINTER | LAZER1; LAZER1 | EEEEEEE |

The container object includes a registration unit 376 designed to effect the necessary data exchange with the Name Service to complete the registration function. The registration unit 376 receives a registration message from the fine grain objects within the container as well as performs the registration functions of the container itself with the Name service. In a preferred embodiment, objects in the system attempt to register with the Name Service upon initialization.

Figure 6:
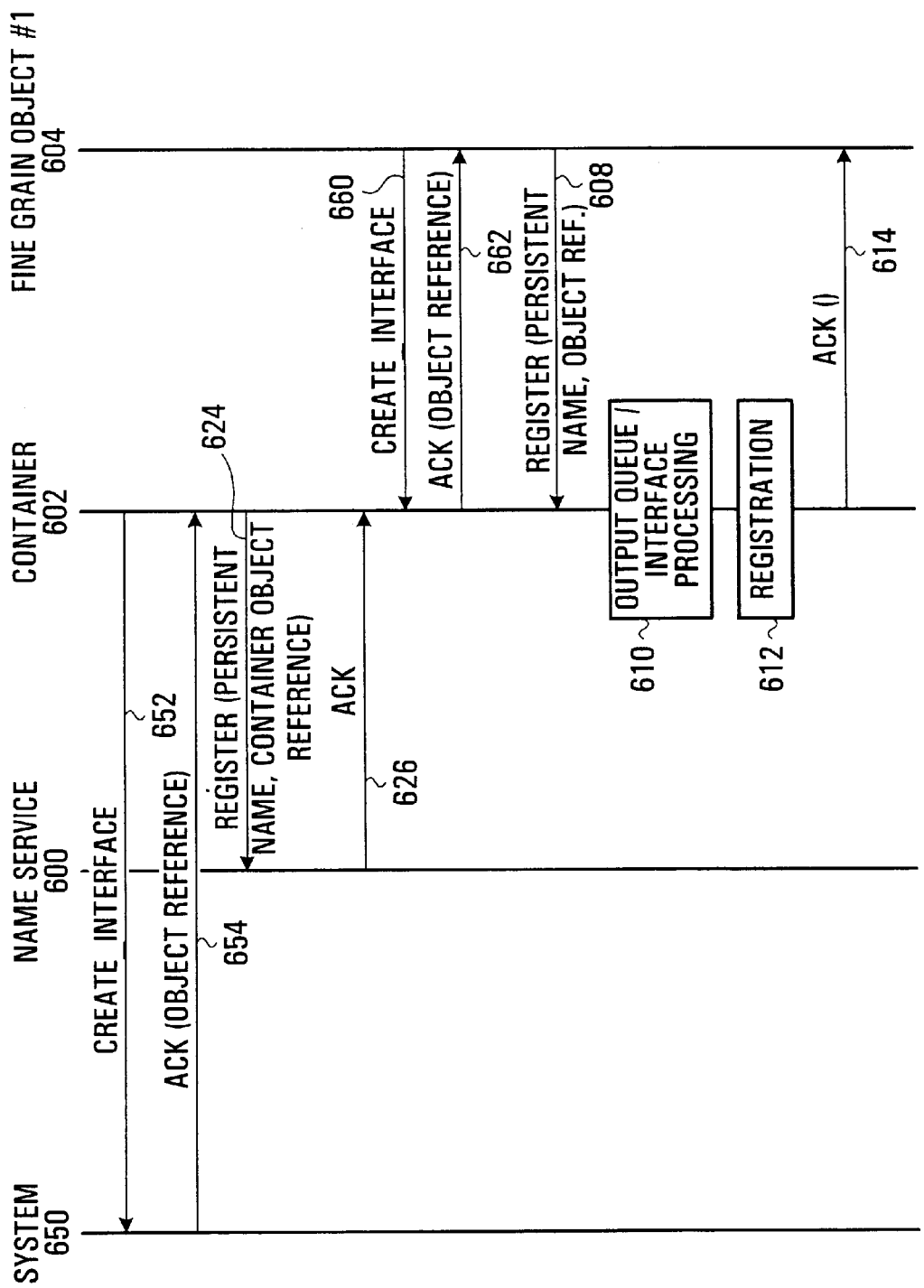
FIG. 6 shows a flow diagram for the process of registering a container object with a Name Service and registering fine grain objects with a container in accordance with the spirit of the invention.

In a typical interaction, as shown in FIG. 6, a container 602 first initializes itself and sends a message 652 to the system 650 requesting that an interface be created for it. The system 650 receives the message, creates the interface and sends an acknowledgement message 654 to the container 602 along with an object reference associated with the interface created. The container 602 then sends a registration message 624 to the Name Service 600. The registration message 624 includes the persistent name of the container including the range of identifiers within the container. Optionally, the registration message may include an index resolution algorithm identifier for allowing the Name Service to select and algorithm. The Name Service 600 then acknowledges the registration 626.

Fine grain objects are then initialized. A fine grain object 604 sends a message 660 to the container 602 requesting that an interface be created. In a specific example, object 604 is coded as if it is communicating with the system and its message 660 is in the same format as the container's interface creation message 652. However when initialized the object 604 is given an interface address belonging to the container rather than an interface address specific to the fine grain object. Preferably, the fact that a fine grain object is within a container is transparent to the fine grain object 604. In a specific example, to provide this transparency feature, the container 602 offers an interface similar in form to the system's interface used to create object interfaces. The container 602 returns to the fine grain object 604 the container's own object reference. In effect, this allows fine grain objects within a given container to use the container's interface.

Following this, the fine grain object 604 attempts to register with the Name Service 600 by sending a registration message 608. The registration message includes the persistent name and the object reference of the fine grain object 604. This message 608 is placed within the outgoing message queue 610. When the message reaches the front of the queue, the outgoing processing interface 610 processes it. The processing interface recognizing that the message is for registration, intercepts this message and sends it to the registration unit which registers the fine grain object with the container object 612. Optionally, the outgoing message 608 is directly processed by the outgoing processing unit and the output queue is omitted from the container object. In either option, the effect is similar to that described above for interface creation. The code of the fine grain object 604 is written as if that object were an independent object registering with the system's Name Service, but in fact this registration is delivered to an interface of the container 602 which is similar in form to the system's corresponding interface. In a specific example, no change is required in the code of the fine grain object 604 in order to implement that object within a container rather than as an independent object. During the registration procedure 612, the container 602 creates a new entry in its data structure and assigns an index value to the object in order to allow incoming messages to identify the object by its index value. The container 602 then sends an acknowledgement message 614 to the fine grain object 604. Preferably, the message 614 contains the container's object reference to which is appended the index assigned to the fine grain object. Typically, the internal format of an object reference is opaque to objects using the object reference and therefore the fine grain object is not aware that its object reference has been modified by appending an index. This procedure is repeated for each fine grain object with a container.

Alternatively the container may assign an index to a fine grain object when the container's registration unit receives message 660, in order that that the object reference returned in message 662 may comprise the container's object reference and the fine grain object's index. The container may use other methods to assign an index to a fine grain object without detracting from the spirit of this invention.

Figure 10:
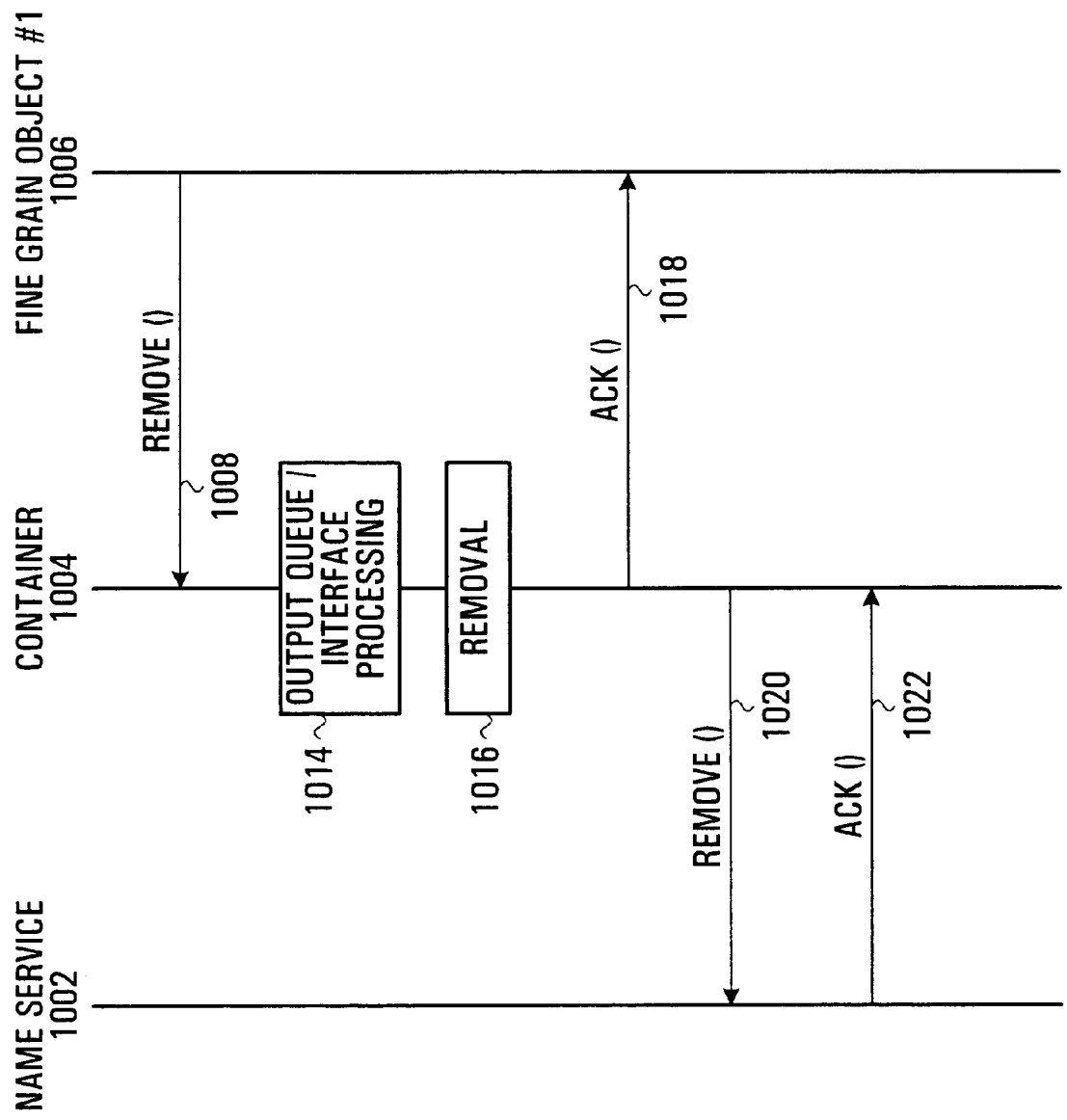
FIG. 10 shows a flow diagram for the process of removing a container object from a Name Service and removing fine grain objects from a container in accordance with the spirit of the invention.

The container object comprises a removal unit 380. When a fine grain object is deactivated, as shown in FIG. 10, the fine grain object 1006 sends a removal message 1008 to the Name Service. In a specific example, the message 1008 contains the persistent name and object reference values of the object to remove. Preferably, appended to this object reference in a manner transparent to the fine grain object is that object's index. The removal message 1008 is placed in the outgoing message queue 1014 and is intercepted by the container 1004. The container removal unit 380 removes the entry 1016 corresponding to the fine grain object from its data structure 378 and sends an acknowledgement message 1018 to the fine grain object 1006. When all fine grain objects have been removed from the container object 1004, the container object 1004 may be deactivated. In a typical interaction, the removal unit 380 of the container object sends a message 1020 to the Name Service 1002 requesting that its entry be removed. The Name Service 1002 locates the entry and removes it from its list of entries. It then sends an acknowledgement message 1022 to the container object 1004. The container 1004 receives the acknowledgement message 1022 and if all the other housekeeping activities are complete, it is deactivated. The removal unit 380 may not be present in certain embodiments of the present invention and the absence of this unit does not detract from the spirit of the invention.

Figure 4:
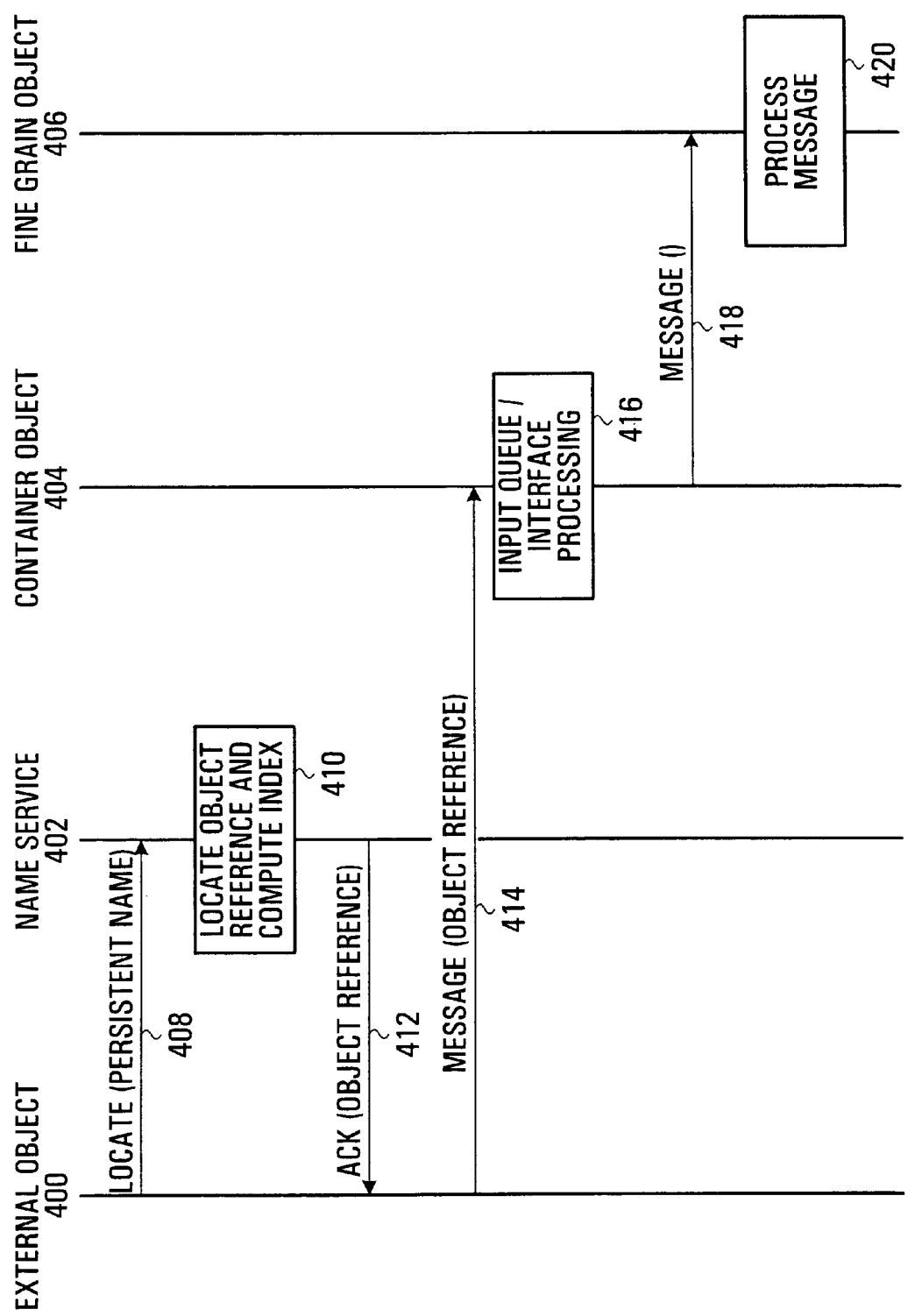
FIG. 4 shows a flow diagram for the process of sending a message to a fine grain object within a container in accordance with the spirit of the invention.

Once an object is registered, it may communicate with other objects in the system using the Name Service. When a message is sent to any fine grain object in a container, the system uses a two-part object reference. One part is a standard object reference, which the system manages and which identifies the container. The other is an index, which is managed by the container system and by the Name Service supporting fine grain objects. In a preferred embodiment, the index is embedded in the object reference and the use of the index is transparent to objects in the system. In the specific example of the CORBA system, this may require an extension of the CORBA run time system, but little or no change to the CORBA compiler or the main parts of the CORBA run time system. In a typical interaction, as shown in FIG. 4, an external object 400 sends a message 408 to the Name Service 402 requesting the object reference of an entity. The request message 408 contains the persistent name including the Kind and Identifier of the entity sought. The persistent name may be the name of a standalone object, or of an object in a container. The Name Service 402 receives the message 408 and looks up the object reference 410. In looking up the persistent name reference, the Name Service identifies the Kind of the object and checks if the identifier portion of the persistent name is in the Identifier range of any registered container object. If the object is within a container's range of identifiers, the name service calculates an index value for the object within its container using a pre-determined algorithm. In a specific example, for a standalone object the index value is zero. A specific example will better illustrate this process. An external object sends a message to the Name Service requesting the object reference of the object with the persistent name "USER; 555-1757". The Name Service looks up this reference by checking for each persistent name entry with a Kind "USER" to see if the identifier "555-1757" is in the range. A portion of the look-up table of the Name Service is shown below.

| Entry # | Kind | Identifier Range | Object Reference |
|---|---|---|---|
| 1 | USER | 555–0000; 555–0999 | A452C67 |
| 2 | USER | 555–1000; 555–1999 | B56345E |
| ... | ... | ... | ... |
| K | TERMINAL | V01; V49 | AFE5270 |
| K + 1 | TERMINAL | V50; V99 | BF35516 |
| K + 2 | PRINTER | LAZER1; LAZER1 | EEEEEEE |

The Name Service finds that entry #2 satisfies the query. Following this, the Name Service applies an algorithm to the Identifier "555-1757" to determine its corresponding index. In a specific example, the algorithm is a simple subtraction of the lower bound of the range of identifier with the identifier being sought namely, (555-1757) minus (555-1000)=757=index. This index will be used to identify the particular fine grain object within the container.

Following this, the Name Service 402 sends an acknowledgement message 412 to the external object 400 containing the object reference of the container object including an index value corresponding to the fine grain object sought. The external object 400 receives the object reference which includes the container's object reference and the index from the Name Service and sends a message 414 to the fine grain object using the container object reference with the index. In a specific example, the external object 400 is not aware that the persistent name it has supplied is the name of an object that is implemented within a container, nor is it aware of the presence of an index in the object reference returned. Thus as with the fine grain object itself, the existence of containers and their use does not require alteration in the coding of an external object which may from time to time communicate with objects that are implemented within containers.

The interface of Container 404 receives this message in the usual way and places it in the incoming queue 416. When the message reaches the front of the queue, the message is processed by the container interface 416 processing. This processing may involve translating the message into a specific format, adding or removing certain items of information or other types of processing. In a specific example, containers are implemented with CORBA and the interface processing is performed in the usual CORBA interface manner. In a preferred embodiment, CORBA is aware of the existence of the container, since the container's interface is a CORBA interface, so CORBA delivers the message to the container. Preferably CORBA is not aware of the existence of fine grain objects within the container. The container is aware of the possible presence of an index in the object reference, and makes use of that index to locate the fine grain object using its data structure 378. Following this, the processed message 418 is delivered to the fine grain object 406 in the container corresponding to the index. The fine grain object 406 then processes the message 420.

Preferably, a special index value may be reserved to allow the sending of messages specifically to a container rather than to any fine grain object within that container. Preferably this same special value may also be used as the index of an independent object. Messages to the container may be used by software which manages the operation of a system, for example to verify the number of fine grain objects present within a container.

Figure 5:
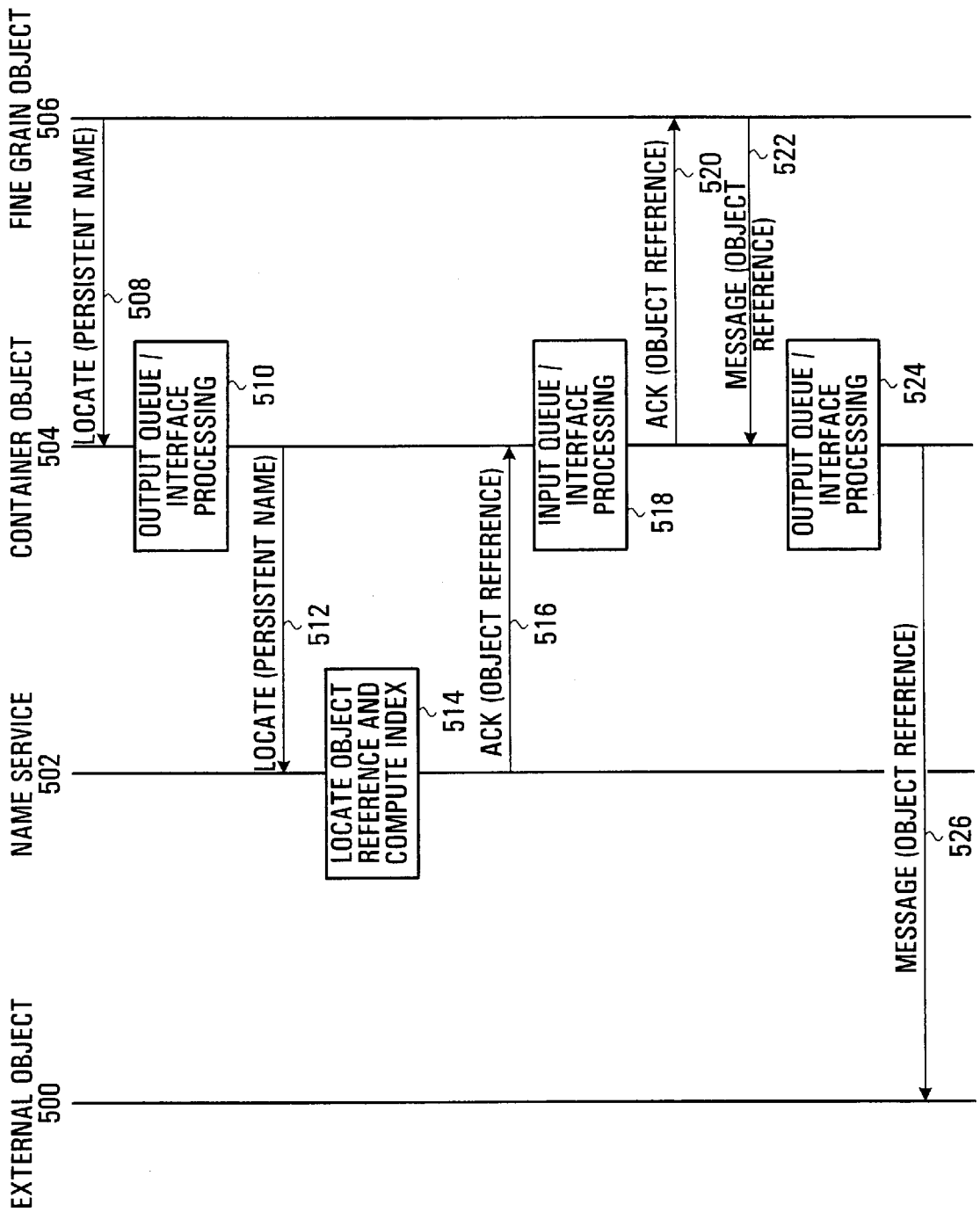
FIG. 5 shows a flow diagram for the process of sending a message from a fine grain object within a container in accordance with the spirit of the invention.

In a preferred embodiment of the invention, the container object provides a means for fine grain objects to send messages to external objects. In a typical interaction, as shown in a FIG. 5, to send a message, the fine grain object 506 first sends a locate message 508 to the Name Service 502. The locate message includes the persistent name of the external object to locate. The message 508 is intercepted by the container object and placed in the output queue 510. When the message reaches the front of the queue, it is processed by the outgoing processing interface. The processed message 512 is then sent to the Name Service 502. The Name Service processes the request 514 and returns an acknowledgment message containing the object reference including the index of the external object sought. The external object can be either a fine grain object or an independent object. Preferably, in either case object 506 is not aware which kind of external object it has found. The acknowledgment message is directed to the fine grain object but is first intercepted by the container 504 which places the acknowledgment message in the input queue 518. When the message reaches the front of the queue it is processed by the incoming interface processing 518. The processed message 520 is then sent to the fine grain object 506. The fine grain object makes use of the received object reference and index to send a message to the external object 500. Again the message is intercepted by the container and placed in the output queue and processed by the outgoing processing when it reaches the front of the queue 524. Following this, the message 526 is transmitted to the external object 500. Preferably, the external object is not aware that the sender is a fine grain object when it receives the message. The external object 500 can return a reply to the sender 506 (provided that the message system comprises the general capability to reply to the sender of a message) without knowing that it is replying to a fine grain object. This capability is inherent in the incorporation of an index in each object reference that is exported from the container on behalf of a fine grain object within the container.

A fine grain object within a container may also communicate with other fine grain objects that are within the same container. In a particular example, if the persistent name in message 508 is a name within the range of names belonging to the container object 504, then the object reference returned in message 520 comprises the object reference of container object 504 and an index which identifies a particular fine grain object within that container. When that object reference is used in sending message 522, the message system (such as CORBA) directs the message to the interface of container object 504 in the usual fashion. On arrival at that interface the message is processed in a manner similar to the message 414 in FIG. 4. Because the use of container objects is transparent to both the senders and receivers of messages, this special case of a message within the same container does not require any unusual handling anywhere in the system.

In a variant of the invention, the output queue processing 524 may recognize that the container object reference in message 522 is the object reference of its own container, and may pass the message directly to the input queue processing of container 504, avoiding the processing involved in passing the message through a message system such as CORBA. This improvement is particularly advantageous in a system where many messages are local, for example in telephony where local calls are more common than long distance calls.

Figure 7:
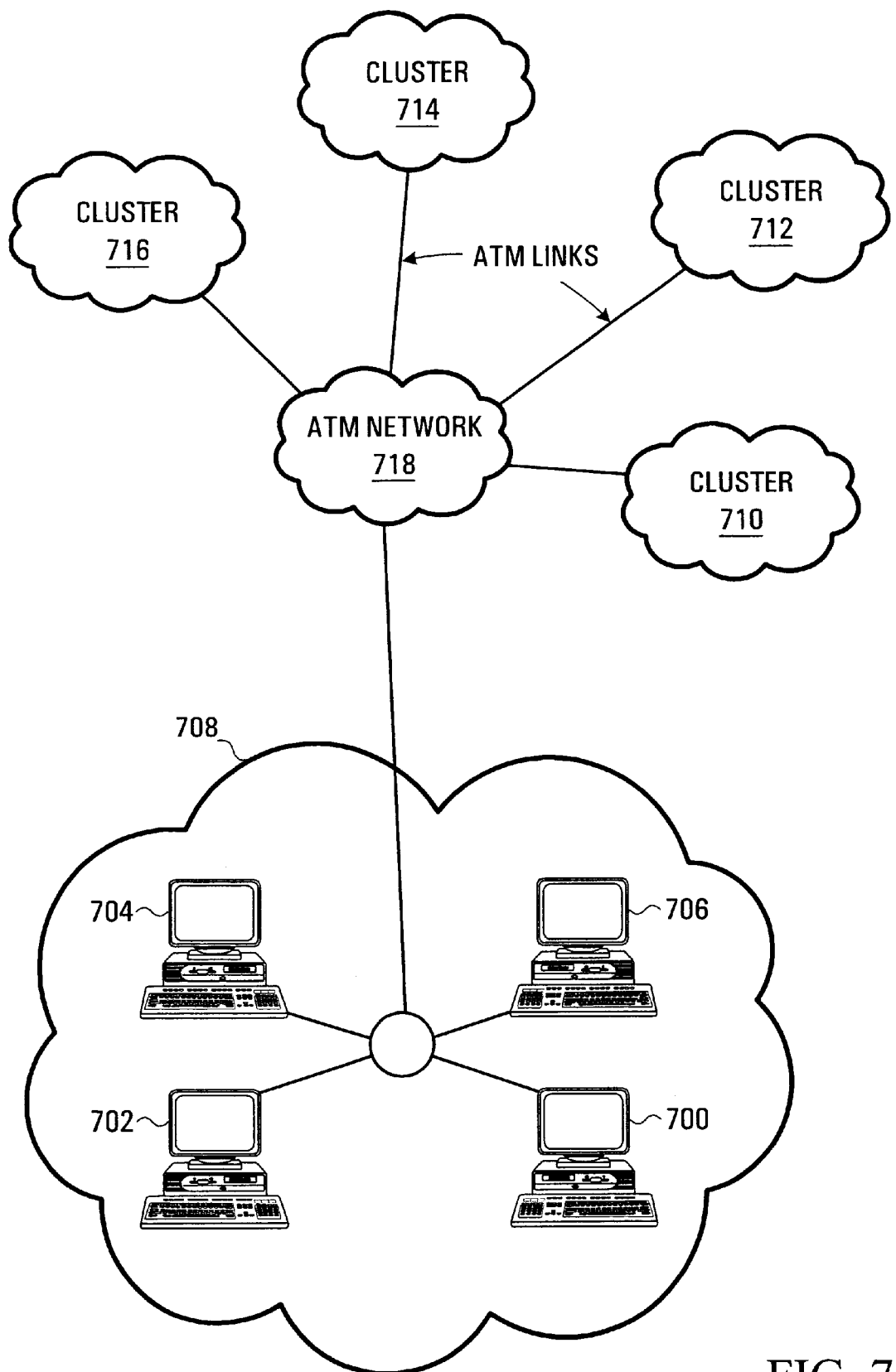
FIG. 7 shows a distributed computing network where objects in accordance with this invention can be implemented.
Figure 8:
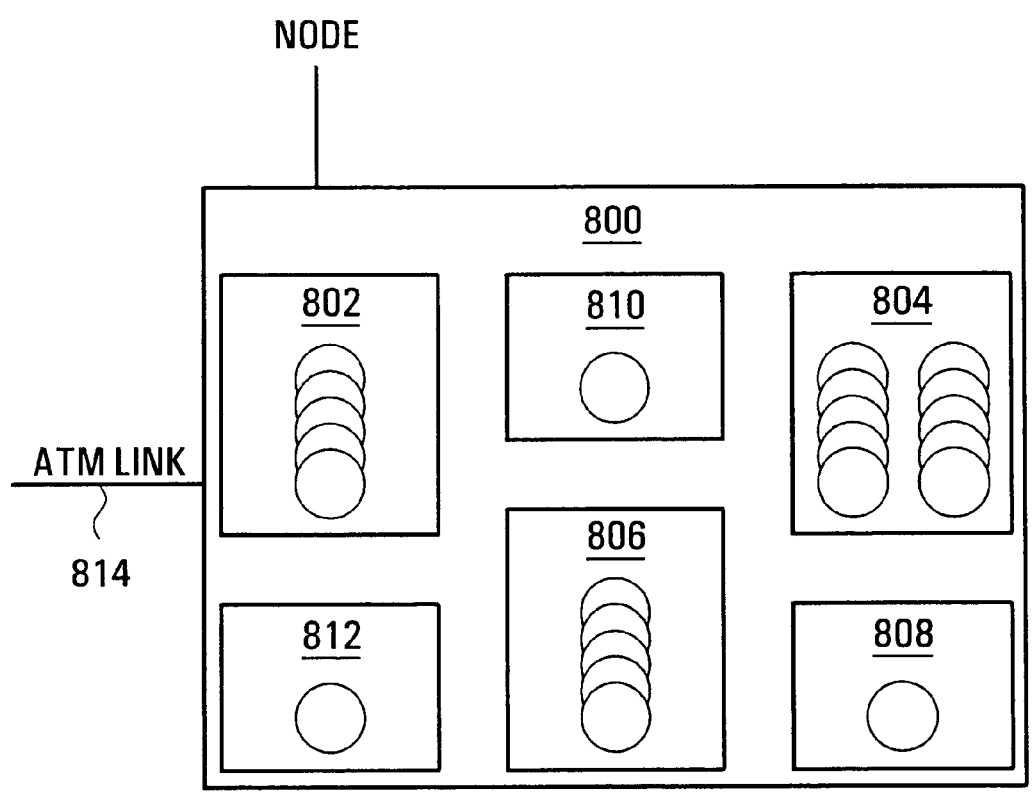
FIG. 8 shows an apparatus containing container objects and independent objects in accordance with the spirit of the invention.

The systems that can make use of the invention may be a single discrete computing apparatus or be of a distributed nature. In a distributed system, as shown in FIG. 7, different parts of a software application run on different computing machines that are interconnected to form a network. These physical machines, herein designated as nodes 700 702 704 706, may reside in geographically remote locations, and communicate using a set of predefined protocols. The objects and software modules described in this specification operate on these nodes. FIG. 8, shows in block form a node 800 containing container objects 802 804 806 and Independent objects 808 810 812. The node may also contain the Name Service or a local Name Service which may be a copy of or a part of the main Name Service.

Because there are far fewer containers than objects, it is practical in some situations for the Name Service to distribute the name ranges of all of publicly registered containers to every node in a cluster. This allows location of any named object in the cluster without sending an off-node lookup message resulting in reduced processing/waiting time. This preferred method of distributing registrations within the Name Service is an example of the benefits of registering containers rather than individual fine grain objects, but other implementations of a Name Service supporting named containers are possible without detracting from the spirit of this invention. The objects 802 804 806 808 810 812 may communicate with each other or with objects in other nodes through the ATM link 814. The set of nodes 700 702 704 706 are grouped into a cluster 708. A cluster is a group of nodes which are able to communicate with one another and the world outside the cluster. The nodes in the cluster may share resources and may perform functions in cooperation with one another. A set of clusters 708 710 712 714 and 716 are in turn interconnected through an ATM network 718. The ATM network 718 may be a private or public network. Protocols such as TCP/IP, client/server architecture and message passing are all possible methods of achieving communication between objects in a distributed computing environment. In addition to these communication protocols a standard communication interface is used, such as those defined by the Object Management Group (OMG,) to allow access to the various objects in the system. For more information on distributed processing, the reader is invited to consult Operating Systems by William Stallings, Prentice Hall $2^{nd}$ edition 1995, whose content is hereby incorporated by reference. The preferred embodiment of this invention uses the C++ programming language with a CORBA (Common Object Request Broker Architecture) interface. Other programming languages may be used in the context of the present invention and the use of such a language does not deter from the spirit of this invention.

Although the present invention has been described in considerable detail with reference to certain preferred versions thereof, other versions are possible. Therefore, the spirit and scope of the appended claims should not be limited to the description of the preferred versions contained herein.

We claim:

1. A computer readable storage medium containing a program element for execution by a computer for implementing a software Name Service object, said software Name Service object comprising:
    an interface for receiving look-up request messages containing persistent names of software objects;
    a data structure for storing a plurality of entries, each entry being indicative of a range of persistent names mapped to at least one container object reference;
    a functional module responsive to reception of a look-up request message by said interface, the look-up request message containing a certain persistent name to locate in said data structure the entry including a range of persistent names encompassing the certain persistent name;
    an index resolution unit for computing an index for the container object reference in the entry including a range of persistent names encompassing the certain persistent name, when the container object reference in the entry including a range of persistent names encompassing the certain persistent name is qualified by the index permitting to uniquely identify the software object referred to by the certain persistent name;
    said interface being operative to generate a response message to the look-up request message, said response message containing the container object reference in the entry including a range of persistent names encompassing the certain persistent name, qualified by the index.

2. A computer readable storage medium as defined in claim 1, wherein said index resolution unit computes the index at least in part on a basis of the certain persistent name.

3. A computer readable storage medium as defined in claim 2, wherein said index resolution unit computes the index at least in part on a basis of the certain persistent name and the range of persistent names including the certain persistent names.

4. A computer readable storage medium as defined in claim 3, wherein the range of persistent names is characterized by an upper bound and by a lower bound, said index resolution unit computing the index at least in part on a basis of the certain persistent name and either one of the upper bound and the lower bound.

5. A computer readable storage medium as defined in claim 1, wherein said functional module is responsive to reception of a registration request message containing a range of persistent names and a container object reference corresponding to said range of persistent names to create an entry in said data structure.

6. A computer readable storage medium containing a program element for execution by a computer for implementing a software Name Service object, said software Name Service object comprising:
    interface means for receiving look-up request messages containing persistent names of software objects;
    a data structure for storing a plurality of entries, each entry being indicative of a range of persistent names mapped to at least one container object reference;
    functional module means responsive to reception of a look-up request message by said interface, the look-up request message containing a certain persistent name to locate in said data structure the entry including a range of persistent names encompassing the certain persistent name;
    index resolution means for computing an index for the container object reference in the entry including a range of persistent names encompassing the certain persistent name, when the container object reference in the entry including a range of persistent names encompassing the certain persistent name is qualified by the index permitting to uniquely identify the software object referred to by the certain persistent name;
    said interface means being operative to generate a response message to the look-up request message, said response message containing the container object reference in the entry including a range of persistent names encompassing the certain persistent name, qualified by the index.

7. A method for mapping a persistent name of a software object to a unique container object reference, said method comprising the steps of:
    storing a plurality of entries in a data structure, each entry including a range of persistent names mapped to a container object reference;
    receiving a look-up request message containing a certain persistent name of a software object;
    searching said data structure for an entry including a range of persistent names, said range of persistent names containing the certain persistent name;
    computing an index value corresponding to the entry in said data structure including a range of persistent names containing the certain persistent name, the container object reference in the entry in said data structure including a range of persistent names containing the certain persistent name when qualified by the index value permitting to uniquely identify the software object referred to by the certain persistent name;
    generating a response message to the look-up request message, said response message containing the container object reference qualified by the index value permitting to uniquely identify the software object referred to by the certain persistent name.

8. A method as defined in claim 7, comprising the step of computing the index value at least in part on a basis of the certain persistent name.

9. A method as defined in claim 8, comprising the step of computing the index at least in part on a basis of the certain persistent name and the range of persistent names including the certain persistent names.

10. A method as defined in claim 9, wherein the range of persistent names is characterized by an upper bound and by a lower bound, said method comprising the step of computing the index at least in part on a basis of the certain persistent name and either one of the upper bound and the lower bound.

11. A computing apparatus including a processor, a memory and a program element in said memory for execution by said processor for implementing a software Name Service object, said software Name Service object comprising:

an interface for receiving look-up request messages containing persistent names of software objects;

a data structure for storing a plurality of entries, each entry being indicative of a range of persistent names mapped to at least one container object reference;

a functional module responsive to reception of a look-up request message by said interface, the look-up request message containing a certain persistent name to locate in said data structure the entry including a range of persistent names encompassing the certain persistent name;

an index resolution unit for computing an index for the container object reference in the entry including a range of persistent names encompassing the certain persistent name, when the container object reference in the entry including a range of persistent names encompassing the certain persistent name is qualified by the index permitting to uniquely identify the software object referred to by the certain persistent name;

said interface being operative to generate a response message to the look-up request message, said response message containing the container object reference in the entry including a range of persistent names encompassing the certain persistent name, qualified by the index.

12. A computing apparatus as defined in claim 11, wherein said index resolution unit computes the index at least in part on a basis of the certain persistent name.

13. A computing apparatus as defined in claim 12, wherein said index resolution unit computes the index at least in part on a basis of the certain persistent name and the range of persistent names including the certain persistent names.

14. A computing apparatus as defined in claim 13, wherein the range of persistent names is characterized by an upper bound and by a lower bound, said index resolution unit computing the index at least in part on a basis of the certain persistent name and either one of the upper bound and the lower bound.

15. A computing apparatus as defined in claim 14, wherein said functional module is responsive to reception of a registration request message containing a range of persistent names and a container object reference corresponding to said range of persistent names to create an entry in said data structure.

* * * * *